US008656949B2

(12) United States Patent
Fourkas et al.

(10) Patent No.: US 8,656,949 B2
(45) Date of Patent: Feb. 25, 2014

(54) MICROFLUIDIC DEVICES AND METHODS OF FABRICATION

(75) Inventors: John T. Fourkas, Bethesda, MD (US); Christopher N. LaFratta, Brighton, MA (US)

(73) Assignee: University of Maryland College Park, College Park, MD (US)

( * ) Notice: Subject to any disclaimer, the term of this patent is extended or adjusted under 35 U.S.C. 154(b) by 1357 days.

(21) Appl. No.: 11/838,355

(22) Filed: Aug. 14, 2007

(65) Prior Publication Data
US 2008/0041475 A1 Feb. 21, 2008

Related U.S. Application Data

(60) Provisional application No. 60/822,429, filed on Aug. 15, 2006.

(51) Int. Cl.
*B29C 33/54* (2006.01)
*F15C 1/02* (2006.01)
*F15C 1/06* (2006.01)

(52) U.S. Cl.
USPC .............. 137/561 A; 137/561 R; 137/833; 264/221

(58) Field of Classification Search
USPC ........... 137/561 A, 561 R, 597, 833; 264/221
See application file for complete search history.

(56) References Cited

U.S. PATENT DOCUMENTS

| | | | |
|---|---|---|---|
| 5,381,848 A * | 1/1995 | Trabucco | 164/102 |
| 6,086,740 A | 7/2000 | Kennedy | |
| 6,251,343 B1 | 6/2001 | Dubrow et al. | |
| 6,316,781 B1 | 11/2001 | Nagle et al. | |
| 6,379,974 B1 * | 4/2002 | Parce et al. | 436/180 |
| 6,399,389 B1 | 6/2002 | Parce et al. | |
| 6,418,968 B1 | 7/2002 | Pezzuto et al. | |
| 6,772,513 B1 * | 8/2004 | Frye-Mason et al. | 29/840 |
| 6,790,330 B2 | 9/2004 | Gascoyne et al. | |
| 6,838,680 B2 | 1/2005 | Maher et al. | |
| 6,877,528 B2 | 4/2005 | Gilbert et al. | |

(Continued)

FOREIGN PATENT DOCUMENTS

| | | |
|---|---|---|
| EP | A1129772 | 9/2001 |
| EP | 1526372 A3 | 5/2005 |

(Continued)

OTHER PUBLICATIONS

Miller, S.; "Reversible Sealing Improves Arrays", Anal.Chemistry, 2006, 78(3): 642.

(Continued)

*Primary Examiner* — Craig Schneider
*Assistant Examiner* — Atif Chaudry
(74) *Attorney, Agent, or Firm* — William C. Schrot; AuerbachSchrot LLC

(57) ABSTRACT

The present invention relates to microfluidic devices that comprise a 3-D microfluidic network of microchannels of arbitrary complexity and to a method for fabricating such devices. In particular, the invention relates to a method of forming microfluidic devices having 3-D microfluidic networks that contain open or closed loop microchannels using a single-step molding process without the need for layer-by-layer fabrication, and to the resultant microfluidic devices. The networks of such microfluidic devices may comprise one or more microchannel circuits which may be discrete or interconnected.

19 Claims, 5 Drawing Sheets

Panels C and D

(56) References Cited

U.S. PATENT DOCUMENTS

| | | | |
|---|---|---|---|
| 6,887,384 | B1 | 5/2005 | Frechet et al. |
| 6,906,158 | B2 | 6/2005 | Tully |
| 6,936,811 | B2 | 8/2005 | Kibar |
| 6,960,437 | B2 | 11/2005 | Engelberger et al. |
| 7,007,710 | B2 | 3/2006 | Heller et al. |
| 7,033,473 | B2 | 4/2006 | Gascoyne et al. |
| 7,067,306 | B2 | 6/2006 | Singhvi et al. |
| 7,097,809 | B2 | 8/2006 | Van Dam et al. |
| 7,118,910 | B2 | 10/2006 | Unger et al. |
| 7,143,787 | B1 | 12/2006 | Bauerle et al. |
| 7,169,560 | B2 | 1/2007 | Lapidus et al. |
| 7,216,671 | B2 | 5/2007 | Unger et al. |
| 7,217,321 | B2 | 5/2007 | Hansen et al. |
| 7,226,439 | B2 | 6/2007 | Prausnitz et al. |
| 7,232,109 | B2 | 6/2007 | Driggs et al. |
| 7,238,268 | B2 | 7/2007 | Ramsey et al. |
| 7,244,402 | B2 | 7/2007 | Hansen et al. |
| 7,351,376 | B1 * | 4/2008 | Quake et al. ............ 422/504 |
| 2003/0138779 | A1 | 7/2003 | Parthasarathy et al. |
| 2003/0196714 | A1 | 10/2003 | Gilbert et al. |
| 2003/0234179 | A1 * | 12/2003 | Bang ............ 205/70 |
| 2006/0096691 | A1 | 5/2006 | Bossi et al. |
| 2006/0134599 | A1 | 6/2006 | Toner et al. |
| 2006/0227325 | A1 | 10/2006 | Rulison et al. |
| 2007/0029202 | A1 | 2/2007 | Falk-Jordan et al. |
| 2007/0139451 | A1 | 6/2007 | Somasiri et al. |
| 2007/0141721 | A1 | 6/2007 | Vafai et al. |
| 2007/0145263 | A1 | 6/2007 | Weng |
| 2007/0151335 | A1 | 7/2007 | Sparks et al. |
| 2007/0157739 | A1 | 7/2007 | Sparks et al. |

FOREIGN PATENT DOCUMENTS

| | | |
|---|---|---|
| EP | 1569510 B1 | 11/2011 |
| WO | WO9615576 | 5/1996 |
| WO | WO0060352 | 10/2000 |
| WO | WO0211887 | 2/2002 |
| WO | WO2006093963 | 9/2006 |
| WO | WO2007044642 | 4/2007 |
| WO | WO2007081385 | 7/2007 |
| WO | WO2007081386 | 7/2007 |

OTHER PUBLICATIONS

LaFratta, C. et al., "Replication of Two-Photon Polymerized Structures with Extremely High Aspect Ratios and Large Overhangs", Journal of Physical Chemistry B, 2004, 108: 11256-58.

LaFratta, C. et al., "Soft Lithographic Replication of 3D Microstructures with Closed Loops", PNAS, 2006, 103(23): 8589-8594.

Baldacchini et al., "Acrylic-Based Resin with Favorable Properties for Three-Dimensional Two-Photon Polymerization", J. of Applied Physics, 2004, 95(11): 6072-6076.

Gates, B.D. et al. (2005) "New Approaches to Nanofabrication: Molding, Printing, and Other Techniques," Chem. Rev 105, 1171-1196.

Rogers, J.A. (2003) "Techniques and Applications for Non-Planar Lithography," Mat. Res. Soc. Symp., Proc. vol. 739:31-38.

Unger, M.A. (2000) "Monolithic Microfabricated Valves and Pumps by Multilayer Soft Lithography," Science, vol. 288:113-116.

Belfield, KD et al. (2000) "Near-IR Two-Photon Photoinitiated Polymerization Using a Fluorone/Amine Initiating System," J. AQm. Chem. Soc. 122(1217-1218).

Campagnola, PJ et al. (2000) "3-Dimensional Submicron Polymerization of Acrylamide by Multiphoton Excitation of Xantene Dyes," Macromolecules 33:1511-1513.

Chan TYM et al. (2005) "Photonic band gap templating using optical interference lithography," Phys. Rev. 71:046605.

Cumpston BH et al. (1999) "Two-photon polymerization initiators for three-dimensional optical data storage sand microfabrication," Nature 398:51-54.

Kawata S et al. (2001) "Finer Features for Functional Microdevices," Nature, 412:697-698.

Malek CK et al. (2004) "Applications of LIGA technology to precision manufacturing of high-aspect ratio micro-components and -systems: a review," Microelectronics J. 35:131-143.

Maruo S et al. (1997) "Three-dimensional microfabrication with two-photon-asborbed photopolymerization," Opt. Let. 22(2):132-134.

Moon JH et al. (2005) "Creating Three-Dimensional Polymeric Microstructures by Multi-Beam Interference Lithography," J Macromolecular Sci 45(5):351-373.

Moore DF et al. (1999) "Recent Developments in micromachined silicon," Electron. Commun. Eg. J. 11:261-270.

Serbin J et al. (2003) "Femtosecond laser-induced two-photon polymerization of inorganic hybrid materials for applications in photonics," Optics Let. 28(5):301-303.

Sun H-B et al. (2003) "Two-Photon Laser Precision Microfabrication and Its Applications to Micro-Nano Devices and Systems," J. Lightwave Technol. 21(3):624-633.

Ullal CK et al. (2003) "Triply periodic bicontinuous structures through interference lithography: a level-set approach," J. Opt. Soc. Am. A. 20(5):948-954.

Witzgall G et al. (1998) "Single-shot two-photon exposure of commercial photoresist for the production of three-dimensional structures," Optics Let. 23(22):1745-1747.

Xia Y et al. (1998) "Soft Lithography," Angew Chem Int. Ed. 37:550.

Xia Y et al. (1998) "Soft Lithography," Annu. Rev. Mater. Sci. 28:158-184.

Yang S et al. (2002) "Creating Periodic Three-Dimensional Structures by Multibeam Interference of Visible Laser," Chem. Mater. 14(7):2831-2833.

* cited by examiner

Figure 1

Panels C and D

MICROFLUIDIC DEVICES AND METHODS OF FABRICATION

CROSS-REFERENCE TO RELATED PATENT APPLICATIONS

This application claims priority to U.S. Patent Application Ser. No. 60/822,429, filed on Aug. 15, 2006, which application is herein incorporated by reference in its entirety.

STATEMENT REGARDING FEDERALLY-SPONSORED RESEARCH

This invention was made with government support under ECS0210533 awarded by the National Science Foundation. The government has certain rights in the invention.

FIELD OF THE INVENTION

The present invention relates to microfluidic devices that comprise a 3-D microfluidic network of microchannels of arbitrary complexity and to a method for fabricating such devices. In particular, the invention relates to a method of forming microfluidic devices having 3-D microfluidic networks that contain open or closed loop microchannels using a single-step molding process without the need for layer-by-layer fabrication, and to the resultant microfluidic devices. The networks of such microfluidic devices may comprise one or more microchannel circuits which may be discrete or interconnected.

BACKGROUND OF THE INVENTION

There is an increasing drive towards the miniaturization of scientific and technological devices. This push began in electronics, with the advent of integrated circuits. More recently micromechanical and microfluidic devices have gained increasing attention. Microfluidic systems make it possible to miniaturize entire instruments, increasing portability while decreasing cost. Microfluidics are finding many applications in scientific and biomedical instrumentation and consumer devices. Microfluidic devices are widely used for biological assays and analytical processes. Such devises are used in ELISA techniques, in DNA and RNA arrays, and to facilitate combinatorial chemistry reactions. Microfluidic devices have been designed to serve as sensors, fluid distribution systems, reaction arrays, and "mini-factories." Microfluidic devices are discussed in U.S. Pat. Nos. 6,418,968; 6,251,343; 6,086,740; U.S. Patent Publications Nos. 20070157739; 20070145263; 20070151335; 20070141721; EP-A-1129772; and WO00/60352; WO02/11887; WO96/15576.

Conventional microfluidic systems that are used with aqueous media are often fabricated from polydimethylsiloxane (PDMS). Fabrication begins with the deposition of a thick layer of photoresist, such as SU-8, on a flat substrate. The photoresist is then exposed and developed, leaving a pattern of constant height that is in the shape of the desired channels. The pattern is then immersed in liquid PDMS resin, which is subsequently cured to turn it into an elastomeric solid. The cured PDMS is removed from the substrate and can be treated with an oxygen plasma and then bonded to another substrate to create the microfluidic system. The original master pattern can be used repeatedly to create many micro fluidic systems.

Due to constraints in fabrication techniques, the channels formed in such networks generally lie within a single plane or, at most, within two adjacent planes. Devices with truly three-dimensional channel geometries can be fabricated only with great difficulty, in a process that requires layer-by-layer construction and careful registration (e.g., careful cutting and stacking of layers of PDMS patterned in this manner) at each step (e.g., U.S. Patent Publication No. 20070139451).

Advances in conventional lithography have been responsible for enormous gains in the power of microelectronic devices in the past few decades. The realization that the same lithographic techniques could be applied to micromachines has led to a parallel revolution in microelectromechanical systems ("MEMS") (Lafratta, C. N. et al. (May 23, 2006) "*Soft-Lithographic Replication Of 3D Microstructures With Closed Loops,*" Proc. Natl. Acad. Sci. (USA) 103(23):8589-8594; Rai-Coudhury, P. (1997) HANDBOOK OF MICROLITHOGRAPHY, MICROMACHINING, & MICROFABRICATION (SPIE Optical Engineering Press, Bellingham, Wash.); Moore, D. F. et al. (1999) "*Recent Developments In Micromachined Silicon,*" Electron. Commun. Eng. J. 11:261-270; WO 2006/093963). However, the fact that conventional lithographic techniques are limited in their ability to create features with significant structure in the dimension perpendicular to the substrate on which fabrication is performed constitutes a fundamental limitation for the development of MEMS devices.

Newer lithographic techniques, such as "LIGA" (Malek, C. K. et al. (2004) "*Applications Of LIGA Technology To Precision Manufacturing Of High-Aspect-Ratio Micro-Components And -Systems: A Review,* Microelectron. J. 35:131-143), multiphoton absorption polymerization ("MAP") (Campagnola, P. J. et al. (2000) "3-*Dimensional Submicron Polymerization of Acrylamide by Multiphoton Excitation of Xanthene Dyes,*" Macromolecules 33:1511-1513; Maruo, S. et al. (1997) Opt. Lett 22:132-134; Kawata, S. et al. (2001) "*Finer Features For Functional Microdevices,*" Nature 412: 697-698; Cumpston, B. H. et al. "*Two-Photon Polymerization Initiators For Three-Dimensional Optical Data Storage And Microfabrication,*" (1999) Nature 398:51-54; Sun, H. B. et al. (2003) ",*" J. Lightwave Technol. 21:624-633; Baldacchini, T. et al. (2004) In: ENCYCLOPEDIA OF NANOSCIENCE AND NANOTECHNOLOGY; Schwarz, J. A. et al. (Eds.) Marcel Dekker, New York, pp. 3905-3915; Witzgall, G. et al. (1998) Opt. Lett 23:1745-1747; Belfield, K. D. et al. (2000) "*Near-IR Two-Photon Photoinitiated Polymerization Using a Fluorone/Amine Initiating System,*" J. Am. Chem. Soc 122:1217-1218; Serbin, J. et al. (2003) "*Femtosecond Laser-Induced Two-Photon Polymerization Of Inorganic-Organic Hybrid Materials For Applications In Photonics,*" Opt. Lett. 28:301-303), and multibeam interference lithography ("MBIL") (Yang, S. et al. (2002) "*Creating Periodic Three-Dimensional Structures by Multibeam Interference of Visible Laser,*" Chem. Mater 14:2831-2833; Ullal, C. K. et al. (2003) ",*" J. Opt. Soc. Am. A 20:948-954; Moon, J. H. et al. (2005) J. Macromol. Sci.-Polymer Rev. C45:351-373; Chan, T. Y. M. et al. (2005) Phys. Rev. E Stat. Phys. Plasmas Fluids Relat. Interdiscip. Top 71:046605) also have limited applicability to the production of complex 3D structures.

LIGA is a parallel procedure, but unable to make arbitrarily complex 3D microdevices. MAP is an inherently serial procedure. Structures are created on a voxel-by-voxel basis, and so fabrication on the wafer scale is a slow process. Although MBIL is a highly parallel technique, it can only be used to fabricate periodic structures with spatial periods on the scale of the wavelength of the light used. As a result, none of these techniques is suitable for the mass production of arbitrarily complex 3D microdevices (Lafratta, C. N. et al. (May 23, 2006) "*Soft-Lithographic Replication Of 3D Microstructures With Closed Loops,*" Proc. Natl. Acad. Sci. (USA) 103(23): 8589-8594).

Microtransfer molding ("µTM") procedures have also been explored. In such procedures, one pours an elastomeric resin (e.g., polydimethylsiloxane ("PDMS")) over a master structure and then cures it (Xia, Y. et al. (1998) *"Soft Lithography,"* Angew. Chem. Int. Ed 37:550-575; Xia, Y. et al. (1998) *"Soft Lithography,"* Annu. Rev. Mater. Sci 28:153-184; Gates, B. D. et al. (2005) *"New Approaches to Nanofabrication: Molding, Printing, and Other Techniques,"* Chem. Rev 105, 1171-1196). The mold is then released from the master, filled with a molding material, and pressed against another substrate. The molding material is then cured and the mold released, leaving a replica of the master structure. Microtransfer molding has been used to create wafer-scale replicas of master structures that were created with conventional lithography and to replicate 3-D structures created with MAP (LaFratta, C. N. et al. (2004) *"Replication of Two-Photon-Polymerized Structures with Extremely High Aspect Ratios and Large Overhangs,"* J. Phys. Chem. B; 2004; 108 (31) pp 11256-11258). Because of the elastic nature of the PDMS mold, it is possible to replicate a wide range of structures, including ones with high aspect ratios or substantial overhangs (LaFratta, C. N. et al. (2004) *"Replication of Two-Photon-Polymerized Structures with Extremely High Aspect Ratios and Large Overhangs,"* J. Phys. Chem. B; 2004; 108 (31) pp 11256-11258; Rogers, J. A. (2003) In: THREE-DIMENSIONAL NANOENGINEERED ASSEMBLIES; Orlando, T. M. et al. (Eds.) Materials Res. Soc., Warrendale, Pa., Vol. 739, pp. H.1.2.1).

One deficiency of µTM method is that if the master structure contains a closed loop (such as an arch), when the elastomeric resin is poured over the loop and cured, the loop will be topologically "locked" within the elastomer and thus cannot be released. Thus, closed loop structures cannot be replicated in a single step with µTM. As a result, the molding of closed loops continues to require a layer-by-layer fabrication approach (Gates, B. D. et al. (2005) *"New Approaches to Nanofabrication: Molding, Printing, and Other Techniques,"* Chem. Rev 105, 1171-1196; Rogers, J. A. (2003) In: THREE-DIMENSIONAL NANOENGINEERED ASSEMBLIES; Orlando, T. M. et al. (Eds.) Materials Res. Soc., Warrendale, Pa., Vol. 739, pp. H.1.2.1); Unger, M. A. et al. *"Monolithic Microfabricated Valves and Pumps by Multilayer Soft Lithography,"* (2000) Science 288(5463):113-116) that has not been satisfactory (Lafratta, C. N. et al. (May 23, 2006) *"Soft-Lithographic Replication Of 3D Microstructures With Closed Loops,"* Proc. Natl. Acad. Sci. (USA) 103(23):8589-8594; WO 2006/093963).

In sum, the ability to create truly 3-D microfluidic systems would enable the fabrication of new types of devices and permits one to make existing devices more compact. Unfortunately, current methods of fabrication of 3-D microfluidic networks requires a time-consuming and complex layer-by-layer assembly, involving a delicate registration step at each layer. As a result, 3-D microfluidic systems cannot presently be produced at attractive costs. Thus, a need remains for a technology capable of forming a 3-D microfluidic network in a single step. The present invention is directed to this and related needs.

SUMMARY OF THE INVENTION

The present invention relates to microfluidic devices that comprise a 3-D microfluidic network of microchannels of arbitrary complexity and to a method for fabricating such devices. In particular, the invention relates to a method of forming microfluidic devices having 3-D microfluidic networks that contain open or closed loop microchannels using a single-step molding process without the need for layer-by-layer fabrication, and to the resultant microfluidic devices. The networks of such microfluidic devices may comprise one or more microchannel circuits, which may be discrete or interconnected.

In detail, the invention provides a microfluidic device comprising a 3-dimensional microfluidic network, the network being a single layer composition comprising a closed, hollow microchannel.

The invention also concerns the embodiment of such microfluidic device wherein the network comprises two microchannel circuits, which may be either discrete or interconnected.

The invention also provides a method of fabricating a microfluidic device comprising a 3-dimensional microfluidic network, the network comprising a closed, hollow microchannel, wherein the method comprises the steps of:

(A) opening a sealable casting of a mold of the microfluidic device, the device comprising a closed loop microstructure having the shape of the desired microfluidic network; the casting comprising a 3-dimensional structure comprising an internal cavity that conforms to the shape of the mold;

(B) removing the mold from the casting; and (C) sealing the casting to thereby convert the cavity into the desired microfluidic device.

The invention also concerns the embodiment of such method wherein the network comprises two microchannel circuits, which may be either discrete or interconnected.

The invention also concerns the embodiments of such methods which additionally comprise the step of constructing the sealable casting and/or the step of fabricating the mold.

The invention also concerns the embodiments of such methods wherein the mold comprises a planar membrane and the cavity comprises a space conforming to the shape of the membrane; the planar membrane permitting the casting to be opened to effect removal of the mold. The invention also concerns the embodiments of such methods wherein, after removal of the mold, the casting is sealed by eliminating the cavity space previously occupied by the membrane.

The invention also provides a microfluidic device comprising a 3-dimensional microfluidic network, the network comprising a closed, hollow microchannel, wherein the network is produced through the process of:

(A) opening a sealable casting of a mold of the microfluidic device, the device comprising a closed loop microstructure having the shape of the desired microfluidic network; the casting comprising a 3-dimensional structure comprising an internal cavity that conforms to the shape of the mold;

(B) removing the mold from the casting; and (C) sealing the casting to thereby convert the cavity into the desired microfluidic device.

The invention also concerns the embodiment of such microfluidic device wherein the network comprises two microchannel circuits, which may be either discrete or interconnected.

The invention also concerns the embodiments of such microfluidic devices wherein the process additionally comprises the step of constructing the sealable casting and/or the step of fabricating the mold.

The invention also concerns the embodiments of such microfluidic devices wherein the mold comprises a planar membrane and the cavity comprises a space conforming to the shape of the membrane; the planar membrane permitting the casting to be opened to effect removal of the mold. The invention also concerns the embodiments of such microfluidic devices wherein, after removal of the mold, the casting is sealed by eliminating the cavity space previously occupied by the membrane.

BRIEF DESCRIPTION OF THE FIGURES

FIG. 1 shows a schematic representation of the replication of a master structure with a closed loop. Panel A depicts a master structure for the creation of an arch. The gray plane denotes the membrane. Panel A illustrates the procedure for MA-µTM of the arch. After creation of the arch with MAP, it is immersed in PDMS. The elastomer is then cured and the mold peeled off the substrate. After gentle compression, the mold is filled with a molding material and pressed against a substrate. After curing of the molding material, the mold is removed, leaving a daughter arch without a membrane. Panel C shows a scanning electron micrograph of a master structure; Panel D shows a scanning electron micrograph of a daughter structure; scale bars are 10 µm.

DESCRIPTION OF PREFERRED EMBODIMENTS OF THE INVENTION

The present invention provides a means of creating microfluidic devices that comprise a 3-D microfluidic network of microchannels of arbitrary complexity and to a method for fabricating such devices. In particular, such devices can be created from elastomers such as PDMS using a single master pattern and a one-step process to transfer the pattern into the elastomer. The invention relates to a method for fabricating a network of 3-D (three-dimensional) microchannels for such microfluidic devices, and to such devices themselves. In particular, the invention relates to a method of forming microfluidic devices that comprise a 3-D microfluidic network of open or closed loop microchannels through a single-step molding process without the need for layer-by-layer fabrication, and to single-layer 3-D microfluidic networks. The networks may comprise one or more microchannel circuits which may be discrete or interconnected.

As used herein the term "microfluidic device" refers to device that comprises a network containing one or more microfluid channels, each having cross-sectional dimensions in the range of 1-100 µm, and more preferably in the range of 1-20 µm, or 10-50 µm or 10-100 µm, and lengths of 1-10 millimeters, or even 1-10 centimeters. The cross-sectional geometry of the channels may be circular or elliptical, or may be angular (e.g., having 3, 4, 5, 6, or more sides). Channels of different size, length, or geometry may be employed in the same microfluidic network. Such networks of microchannel(s) may have one, or more than one, microchannel circuit(s), each comprising a microchannel having an input port and an outflow port. Any of a variety of methods may be used to mediate fluid flow in the microchannels of the networks of the present invention, including: air or water pressure, magnetic pumping, peristaltic pumping, capillary diffusion, electrophoresis, photophoresis, thermophoresis, etc. The microchannel(s) of the networks of the devices of the present invention may be discrete (i.e., having no junctions for transfer of fluid or analyte from one microchannel circuit to another), or may be interconnected (e.g., with junctions, valves (one way, two-way, or multi-way), etc. so as to permit communication of fluid from one microchannel circuit to another (see. e.g., U.S. Patent Publication No. 20030196714; U.S. Pat. Nos. 7,232,109; 7,216,671; 7,143,787). The microchannels of the present invention may be either closed (such as a pipe), open (such as a grove or trough), open in part (such as a perforated pipe, or a microchannel that is at one part a pipe and at another part a grove or trough). The microchannels may vary in size, and may have regions that serve as reservoirs, mixing regions, separation regions, etc.

The microfluidic networks of the present invention may have arbitrary complexity. As used herein the term "arbitrary" complexity is intended to denote that the design, shape, orientation, etc. of the microfluidic network of the device is not constrained or limited, but rather is determined on the discretion of the designer of the network.

In accordance with a preferred embodiment of the invention, a closed loop of a microfluidic network may be formed in a single step, as a single layer, in the microfluidic device. As used herein, the term "single layer" is intended to denote that a closed loop of the microfluidic device lies within a single composition and was formed in a single casting step, as opposed to multiple layer-by layer fabrication. The microfluidic devices of the present invention may have multiple single layers in which each single layer contains a closed loop of a microchannel within a single composition that was formed in a single casting step.

The first step in conventional lithography is mask writing, which is a serial process that is relatively slow. However, once a lithographic mask has been created, it can be used repeatedly for the rapid, parallel fabrication of devices on the wafer scale. The present invention provides an analogous approach for the mass production of complex 3-D structures that involves the creation of master structures that can then be replicated in a highly parallel manner. The ability to accomplish this builds upon "Membrane-Assisted µTM" ("MA-µTM"), which provides a means for molding of 3-D objects containing closed loops. "Membrane-Assisted µTM" ("MA-µTM") is fully disclosed in PCT Patent Application Serial No. PCT/US2006/007090, filed on Feb. 27, 2006 (published on Sep. 8, 2006 as WO 2006/093963), which application is herein incorporated by reference in its entirety.

A. MA-µTM

Membrane-Assisted µTM (MA-µTM) (WO 2006/093963) allows for the soft-lithographic replication of true 3-D structures in a single molding step. A technique such as MAP is used to create master structures that have closed loops that are interrupted by thin membranes. In the replication step, one is able to control whether or not the membranes are reproduced. MA-µTM therefore allows one to create, rapidly and with high fidelity, highly complex daughter structures that can include features such as arches or even interlocked rings.

The initial step of MA-µTM involves the use of MAP, preferably following the procedure of Baldacchini, T. et al. (2004) ("*Acrylic-Based Resin With Favorable Properties For Three-Dimensional Two-Photon Polymerization*," J. Appl. Phys 95:6072-6076) to create a master structure from an acrylic resin. For MAP fabrication, an acrylic resin is preferably employed that is composed ethoxylated(6) trimethylolpropane triacrylate (Sartomer) (preferably at approximately 48 wt %); tris(2-hydroxyethyl)isocyanurate triacrylate (Sartomer) (preferably at approximately 49 wt %); and Lucirin TPO-L (BASF) (preferably at approximately 3 wt %). The ethoxylated(6) trimethy-lolpropane triacrylate serves to help reduce shrinkage upon polymerization). The tris(2-hydroxyethyl)isocyanurate triacrylate is provided to promote polymer hardness. Lucirin TPO-L is an acylphosphine oxide radical photoinitiator that has a number of advantageous properties for MAP.

The device mold is them prepared, preferably employing the procedure of LaFratta, C. N. et al. (2004) ("*Replication of Two-Photon-Polymerized Structures with Extremely High Aspect Ratios and Large Overhangs*," J. Phys. Chem. B; 2004; 108(31) pp 11256-11258, or of WO 2006/093963). After thorough mixing, the resin is placed in a cell, such as a microscope slide, that has been treated with (3-acryloxypropyl)trimethoxysilane, a 100-im-thick spacer, and a cover slip. The excitation source is preferably a Ti:sapphire laser (Coherent Mira 900-F) producing 100-fs pulses with a center wavelength of 775 nm at a repetition rate of 76 MHz. The beam is expanded to overfill the back aperture of a 40×, 1.3-NA oil immersion objective (Zeiss Neofluar) on an upright microscope. The position of the focal point of the laser relative to the sample is controlled using a motorized microscope stage (Ludl Bio-Precision). Typical fabrication powers are less than 5 mW.

The membrane of the MA-μTM process is preferably prepared in the same manner as the device mold, by employing a laser to make a single line from one desired boundary (e.g., the "left" boundary) of the membrane to the other (e.g., the "right" boundary) starting an initial boundary position (e.g., the "top" boundary) and progressing to the desired final boundary position (e.g., the "bottom" boundary) with a step size of, for example, 1 μm. Thus, in preferred embodiments, the membrane is a substantially planar (i.e., 2-Dimensional ("2-D")) portion of the device mold. Following fabrication, the sample is preferably washed (e.g., using dimethylformamide, then ethanol), and finally allowed to air dry.

For replication, a few grams of Sylgard 184 (Dow Corning) are mixed in a 10:1 mass ratio of prepolymer and curing agent. The resulting mixture is then centrifuged for several minutes to remove air bubbles. A lightly greased O-ring is placed around the structure, and the PDMS is poured in to fill the O-ring such that a typical final mold is approximately 3 mm thick and 1 cm in area; these parameters are however not critical to the success of the molding. The sample is then placed in an oven (e.g., at 150° C. for 15 min), after which the PDMS mold is carefully peeled off of the substrate with tweezers.

Replicas are typically made by pouring the same acrylic resin formulation used to make the initial microstructures into the mold, removing any excess resin with dry air, and pressing the mold against a flat glass substrate. The sample is then set under an ultraviolet lamp (e.g., for 30 minutes) to cure. After the curing of the molding material, the mold is peeled off of the hardened replica. Typical peeling times and angles are on the order of 3 s and 10°-60°, respectively. Typically peeling angles on the smaller side of this range were used for towers, and those on the larger side of this range were used for structures with opposing overhangs.

Figure 1:
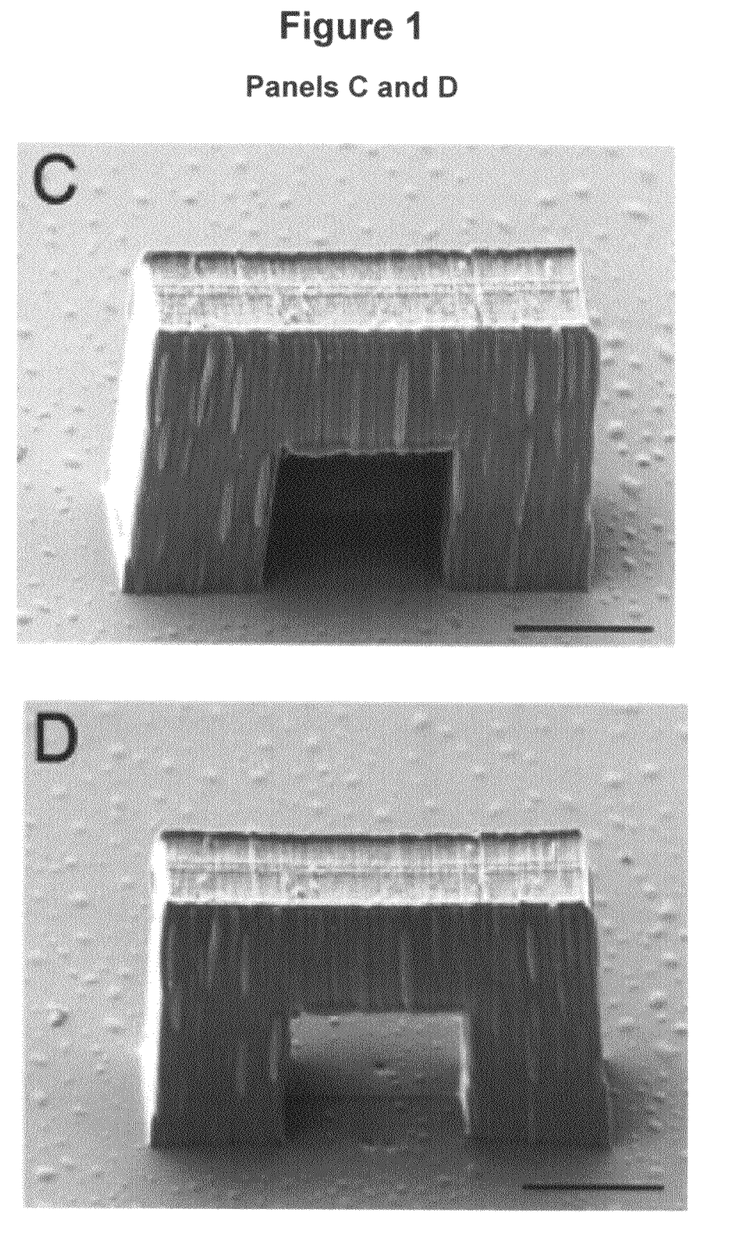

MA-μTM employs a thin membrane to prevent the locking of master structures with closed loops within a mold. This was accomplished by introducing the membrane into the closed loop, such that the elastomer cannot form a closed loop that cannot be released (FIG. 1, Panel A). However, once the elastomer is released from the master, it has a tendency to stick to itself in the region where the membrane was. This self-adhesion can be further promoted by compression of the mold. If the mold is then filled with molding material, no molding material will enter the membrane region, and the replica will have a closed loop in the desired region (FIG. 1, Panel B). The adhesion of the mold to itself in the membrane region is not permanent, and so the replica structure can be released from the mold. It is possible to create a master structure that contains numerous membranes over a large area and to mold a replica in which all of the membranes disappear to create multiple closed loops. An example of a master structure and a daughter structure with a closed loop are shown in FIG. 1, Panel C and FIG. 1, Panel D.

B. Modification of MA-μTM to Permit the Fabrication of Complex 3-D Microfluidic Networks As discussed above, the MA-μTM procedure uses a membrane to permit an "openable" mold of a closed loop so as to produce a desired, solid (i.e., non-hollow channel-containing) structure. The present invention derives in part from the recognition that if the region of the elastomeric mold corresponding to the membrane were permanently closed, the remainder of the mold would form a microchannel in three dimensions. Thus, whereas the MA-μTM procedure is concerned with producing the replicated solid structure resulting from the introduction of a molding composition into the mold, the present invention is concerned with using a master structure to produce a "negative" casting of the mold. Thus, in the present invention, a mold of a device comprising a desired microfluidic network is used to create a casting. The casting creates a cavity that conforms to the shape of the microfluidic network and membrane(s) of the mold. Upon removal of the mold from the casting, the cavity thus comprises a hollow region comprising the desired microfluidic network and 2-dimensional (2-D) planar gaps (corresponding to spaces that had been filled by the membrane(s) of the mold). More than one membrane may be used in the mold, and thus the cavity may comprise more than one planar gaps corresponding to spaces that had been filled by such membranes.

Figure 3:
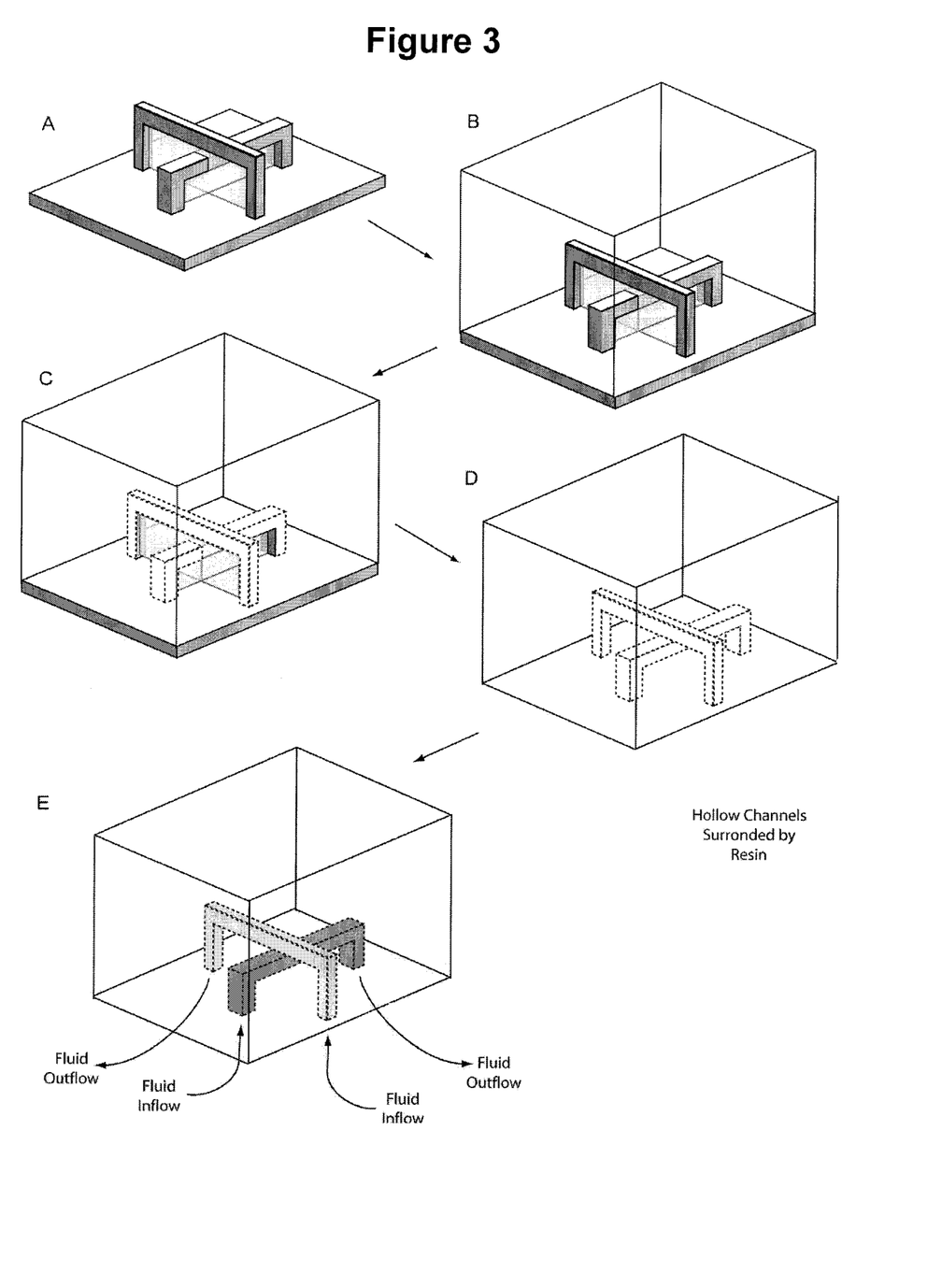
FIG. 3 provides a schematic of a preferred embodiment of the process of the present invention using the master structure shown in FIG. 2.

To form a closed microchannel, any 2-D planar gap(s) that contact the microchannel must be closed, preferably permanently. Closure of such planar gap(s) may be readily accomplished. For example, PDMS can be subjected to an oxygen plasma and then compressed, causing it to bond to itself permanently thereby filling and sealing (i.e., eliminating) the region that had previously been occupied by the membrane (i.e., the "negative" membrane). FIG. 3 provides a schematic of a preferred embodiment of the process of the present invention. FIG. 3, Panel A shows the production of a mold of the desired microfluidic device. The depicted "arches" will become the "pipes" of the final microfluidic device. Two membranes are shown; these permit a casting of the mold to be opened so that the mold may be removed from the casting. FIG. 3, Panel B shows the addition of resin around the "arches" thereby forming the mold. Since the arches contain membranes (as in MA-μTM), the mold is not closed and can be removed. Removal of the mold creates an internal cavity in the casting that conforms to the shape of the device and the membranes (FIG. 3, Panel C). The planar gaps in the cavity that are created by the membranes are permanently closed, as shown in FIG. 3, Panel D, thereby creating hollow, closed channels surrounded by resin. FIG. 3, Panel E shows the use of the ends of the channels as ports for the inflow and outflow of fluids. Since the channels are closed within the resin, the fluids flowing in the channels do not mix (as illustrated by the non-mixing of the shading of the channels in FIG. 3, Panel E).

Figure 4:
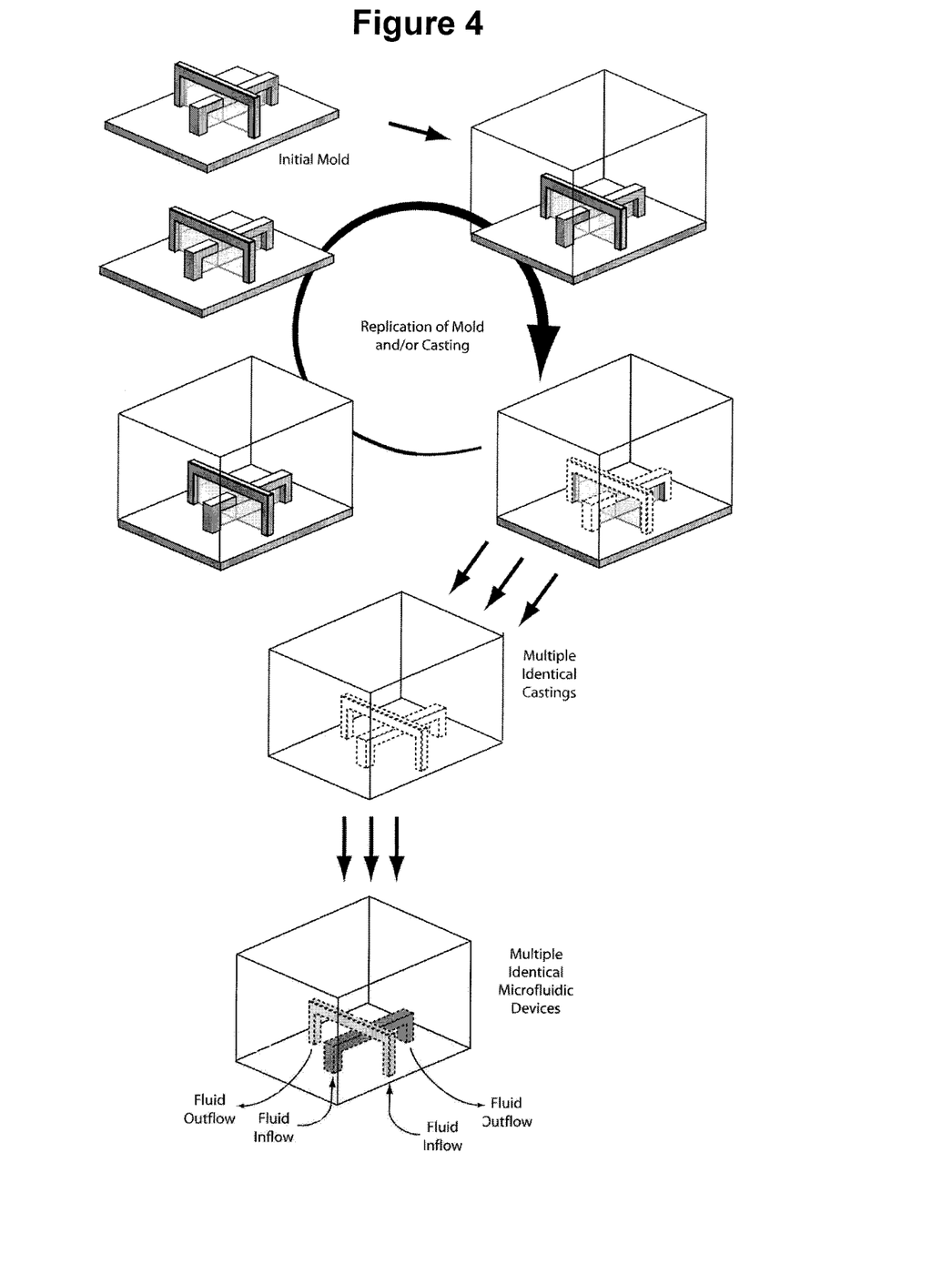
FIG. 4 provides a schematic showing how the molds and castings of preferred embodiments of the present invention can be employed to achieve the mass fabrication of the invention's microfluidic devices.

It is to be noted that the removed mold (FIG. 3, Panel C) can be reused to produce additional castings. Likewise, prior to permanently closing the planar gaps in the cavity that are created by the membranes (FIG. 3, Panel D), the casting may be used to produce additional molds. Thus, the invention provides a means for producing both additional molds and castings and thus permits the mass fabrication of the microfluidic devices of the present invention (FIG. 4).

The methods of the present invention can be employed to create microfluidic devices that comprise 3-D micro fluidic networks over large volumes. Master structures with membranes can be created with a variety of techniques, including but not limited to multi-photon absorption polymerization (MAP), microsterolithography, and LIGA. The horizontal extent of microfluidic networks created in this manner can span many square centimeters, and the vertical extent can range from millimeters to centimeters. A single master can be used to create multiple (i.e. tens to hundreds, or more) replicas of the microfluidic device, and molding techniques can be used to create replicas of the master structure that can be used to create additional masters of the microfluidic device. Thus; a single master structure can be used to create an essentially unlimited number of microfluidic structures; much as is the case for conventional elastomeric microfluidics.

C. Uses of the Microfluidic Networks of the Present Invention

The microfluidic devices of the present invention may be used in any of a broad array of applications may be modified to employ the microfluidic devices of the present invention in lieu of microfluidic devices made using layer-by-layer fabrication methods. Such applications include protein crystallography (e.g., U.S. Pat. Nos. 7,244,402; 7,217,321, etc.); combinatorial chemistry (e.g., U.S. Pat. Nos. 7,097,809; 7,220, 549; 7,169,560; 6,9061,58; 6,887,384; and WO 07081386; WO 7081385, etc.); organic chemistry (e.g., U.S. Patent Publication No. 20030138779;); diagnostic, oligonucleotides sequencing, amplification and forensic medical tests (e.g., U.S. Pat. Nos. 7,169,560; 7,118,910; 7,097,809; 6,960,437; 6,399,389, etc.); drug delivery (e.g., U.S. Pat. Nos. 7,238,268; 7,226,439, etc.), capillary electrophoresis (e.g.), optical detection (e.g., U.S. Patent Publications Nos. 20060227325; 20070029202; EP1526372; U.S. Pat. Nos. 6,838,680; 6,316, 781, etc.), gas chromatography and separation technology (e.g., U.S. Pat. Nos. 7,217,637; 7,007,710, etc.) and cell and particle separations (e.g. U.S. Pat. Nos. 7,033,473; 7,067, 306; 6,936,811; 6,790,330; U.S. Patent Publications Nos 20060134599 and 20060096691; WO 7044642, EP 1569510, etc.).

Having now generally described the invention, the same will be more readily understood through reference to the following examples, which are provided by way of illustration and are not intended to be limiting of the present invention unless specified.

EXAMPLE 1

MA-µTM Master Structure Fabrication Process

Master structures were fabricated from an acrylic resin (25) composed of 48 wt % ethoxylated (6) trimethylolpropane triacrylate, 49 wt % Tris(2-hydroxyethyl)isocyanurate triacrylate, and 3 wt % Lucrin-TPOL (the photoinitiator). The sample preparation and fabrication procedure have been described in detail (25). Typical fabrication powers were less than 5 mW at the sample. The membranes were made under the same conditions as the rest of the structure and were usually fabricated last. A typical membrane is on the order of 500 nm thick, whereas the surrounding features that are to be replicated are generally at least a factor of 4 thicker. After fabrication the unexposed resin was washed away with ethanol.

To create a mold, a few grams of Sylgard 184 were mixed in a 10:1 mass ratio of prepolymer to curing agent. The resulting mixture then was centrifuged for several minutes to remove air bubbles. A PDMS form containing a 1 cm×1 cm×2 mm well, which had previously been modified with (tridecafluoro-1,1,2,2-tetrahydrooctyl) dimethylchlorosilane, was filled with PDMS and vacuum degassed at 100 mtorr pressure (1 torr=133 Pa) for 1 min. The microstructure then was placed onto this degassed PDMS upside down and maintained at 110° C. for 30 min. The PDMS mold then was removed from the PDMS form and carefully peeled off the substrate with tweezers. In most cases the direction of peeling was parallel to the membrane. The same procedure was followed when making molds from replicated structures with the additional step that the replicated polymer be surface modified with (3-aminopropyl) trimethoxysilane, which ensures that the PDMS will cure properly at the polymer interface.

The 1 cm×1 cm×2 mm mold containing the shape of the structure was flexed by placing it over the opening of a 12-mm-diameter hose and reducing the pressure in the hose to 60 torr by using a hand pump. If the negative of the structure is on the side of the PDMS that is exposed to vacuum, the mold will flex to open the membrane, whereas if the negative of the structure is on the opposite side of the PDMS, the mold will flex to close the membrane. After slowly releasing the pressure, the mold was restored to its initial shape, and care was taken to no longer flex it. Although any number of materials can be used to create replicas, here we used the same resin that was used for MAP fabrication. A drop of resin was placed between the mold and a piece of acrylate-modified glass and UV cured (365 nm) for 5 min. After the replica was cured, the mold was removed with tweezers.

EXAMPLE 2

Modification of MA-µTM to Form a Microfluidic Device

Figure 2:
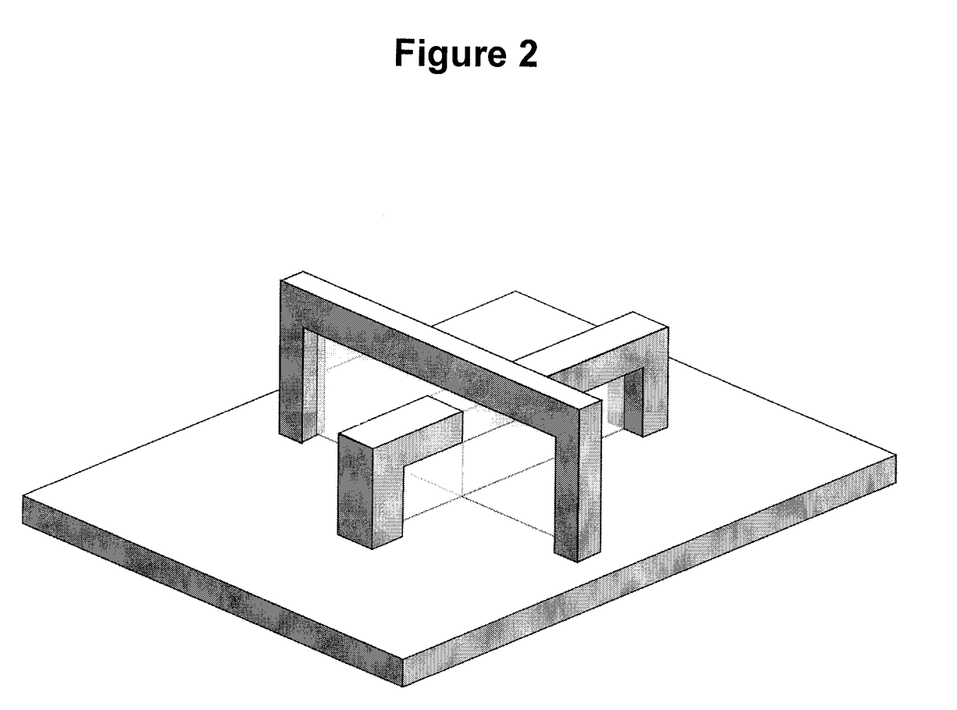
FIG. 2 shows a schematic diagram of a master structure that can be used to create a simple 3-D microfluidic network.

As an example of the present invention, a microfluidic structure is prepared from two solid arches that are at right angles to one another, and one of which passes over the other (FIG. 2). In the master structure, a membrane passes through the center of each arch. Thus, if an elastomeric resin is cured over this structure, it can subsequently be released (in accordance with the MA-µTM method). The cured elastomer can then be subject to an oxygen plasma and compressed, bonding it together in the negative membrane region thereby forming a non-openable, closed loop mold (contrary to the MA-µTM method). The resultant structure will contain two channels, one that passes over the other (FIG. 2).

Figure 5:
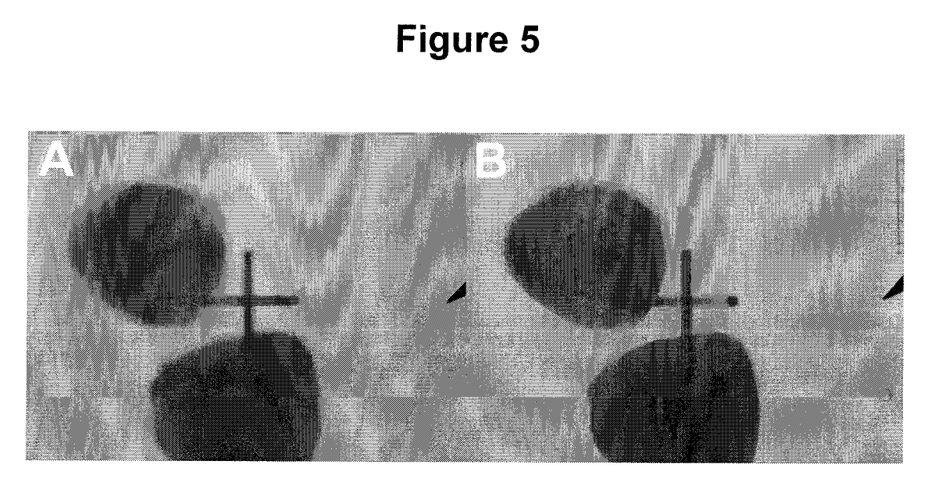
FIG. 5 shows the images of two microfluidic networks of the present invention focused at different depths, and illustrates that the microchannels were at different depths in the PDMS. No crosstalk was visible between the two channels. Each microchannel is 200 µm long.

The structure (FIG. 2) was prepared using a prepolymer resin consisting of a 1:1 mole ratio of dipentaerythritol pentaacrylate (Sartomer SR399) and tris(2-hydroxyethyl)isocyanurate triacrylate (Sartomer SR368) along with 3 wt % of the photoinitiator, Lucirin TPO-1 (BASF). A drop of this resin was placed on a glass slide (25 mm×25 mm×1 mm) previously modified with (3-acryloxypropyl) trimethoxysilane, which acts as an adhesion promoter. A spacer of approximately 200 µm in height was placed around the drop of resin and a coverslip was secured atop the resin. This sample was then placed in an optical microscope under a 40×1.3 NA oil immersion objective. Laser light from Spectra-Physics Mai Tai was sent through the objective and focused inside the resin. The beam had a center wavelength of 790 nm, a pulse width of approximately 100 fs, and at the sample there was approximately 8 mW of average power. The 20 µm×20 µm cross section of each arch support was made by 40 parallel lines each 20 μm long and spaced 0.5 μm apart. They were made at 10 μm/s. Both arches were made concurrently, one layer at a time with a difference of 5 μm between layers. After completing both arches, the membrane was fabricated at 30 μm/s by making a single line from one support to the other starting from the top of the arch and going down to the surface of the substrate with a step size of 1 μm. Following fabrication, the sample was washed in dimethylformamide, then in ethanol, and finally allowed to air dry. To ease release of the mold, the sample was $O_2$ plasma treated and placed in a vacuum desiccator with a few drops of (tridecafluoro-1,1,2, 2-tetrahydrooctyl)dimethyl chlorosilane for 15 minutes. The molding material, Sylgard 184, was mixed in 10:1 ratio, base to curing agent, and degassed under vacuum. This degassed PDMS was poured into a 1 cm×1 cm×2 mm form and the sample was placed upside down onto the liquid PDMS and heated at 120° C. for 30 minutes. After curing, the mold was carefully removed with tweezers by peeling in the direction 45° between both arches. When the mold was removed it was gently flexed in a clamp to a have radius of curvature of about 1 cm with the sample cavity on the convex side of the bent mold. The region of the mold corresponding to the membrane was now exposed in this flexed mold and was $O_2$ plasma treated in order to permanently seal it. After plasma treatment, it flexed to the same degree as before but this time the sample cavity was on the concave side of the mold. The tension in the mold was slowly released and the flat mold was heated at 120° C. for 10 minutes. After this heat treatment the area where the membranes were was sealed. A drop of red food coloring was then placed at an opening of one microchannel and a drop of blue food coloring at one opening of the other microchannel. After the channels had filled by capillary action, photographs were taken at different depths (FIG. 5). Visual examination of the microfluidic network showed no dye crosstalk between the two channels, indicating that the fluid in one microchannel was not leaking into the other.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A microfluidic device comprising a 3-dimensional microfluidic network, said network being a single layer composition comprising:
    a closed loop microchannel disposed within said single layer composition, wherein said microchannel has a first end, an opposite second end, and a central portion disposed between and interconnecting said first end and said second end; and
    a planar bonded region disposed within said single layer composition, said planar bonded region in communication with and extending outwardly from and along said central portion from said first end to said second end of said closed loop microchannel.

2. The 3-dimensional microfluidic device of claim 1, wherein said network comprises two closed loop microchannels disposed within said single layer composition.

3. The 3-dimensional microfluidic device of claim 2, wherein said two closed loop microchannels of said network are discrete.

4. The 3-dimensional microfluidic device of claim 2, wherein said two closed loop microchannels of said network are interconnected.

5. The 3-dimensional microfluidic device of claim 2, wherein said planar bonded region is a first planar bonded region in communication with and extending outwardly from a first of said two closed loop microchannels, further comprising a second planar bonded region in communication with and extending outwardly from a second of said two closed loop microchannels.

6. The 3-dimensional microfluidic device of claim 5, wherein said first planar bonded region lies on a first plane and said second planar bonded region lines on a second plane angularly disposed relative to said first plane.

7. The 3-dimensional microfluidic device of claim 5, wherein said first plane is substantially perpendicular to said second plane.

8. The 3-dimensional microfluidic device of claim 5, wherein said second planar bonded region is in communication with both of said two closed loop microchannels.

9. The microfluidic device of claim 5, wherein said second negative membrane region is in communication with said at least two closed loop microchannels.

10. The 3-dimensional microfluidic device of claim 1, wherein said microchannel has a cross-sectional dimension of about 100 μm or less.

11. A microfluidic device comprising a 3-dimensional microfluidic network, said network being a single layer composition comprising:
    a closed loop microchannel disposed within said single layer composition, wherein said microchannel has a first end, an opposite second end, and a central portion disposed between and interconnecting said first end and said second end; and
    a negative membrane region disposed within said single layer composition, said negative membrane region in communication with and extending outwardly from and along said central portion from said first end to said second end of said closed loop microchannel,
    wherein said network is formed utilizing a mold comprising a closed loop microstructure and a planar membrane connected to and extending outwardly from said closed loop microstructure, so that said closed loop microchannel has a configuration corresponding to the configuration of said closed loop microstructure and said negative membrane region has a configuration corresponding to the configuration of said planar membrane.

12. The microfluidic device of claim 11, wherein said network comprises at least two closed loop microchannels.

13. The microfluidic device of claim 12, wherein said negative membrane region is a first negative membrane region in communication with and extending outwardly from a first of said at least two closed loop microchannels, further comprising a second negative membrane region in communication with and extending outwardly from a second of said at least two closed loop microchannels.

14. The microfluidic device of claim 13, wherein said first negative membrane region lies on a first plane and said second negative membrane region lines on a second plane angularly disposed relative to said first plane.

15. The microfluidic device of claim 14, wherein said first plane is substantially perpendicular to said second plane.

16. The microfluidic device of claim 11, wherein said at least two closed loop microchannels of said network are discrete.

17. The microfluidic device of claim 11, wherein said at least two closed loop microchannels of said network are interconnected.

18. The microfluidic device of claim 11, wherein said closed loop microstructure is removable through said negative membrane region to effect removal of said mold from said network.

19. The method of claim 11, wherein said microchannel has a cross-sectional dimension of about 100 µm or less.

* * * * *